UNITED STATES PATENT OFFICE.

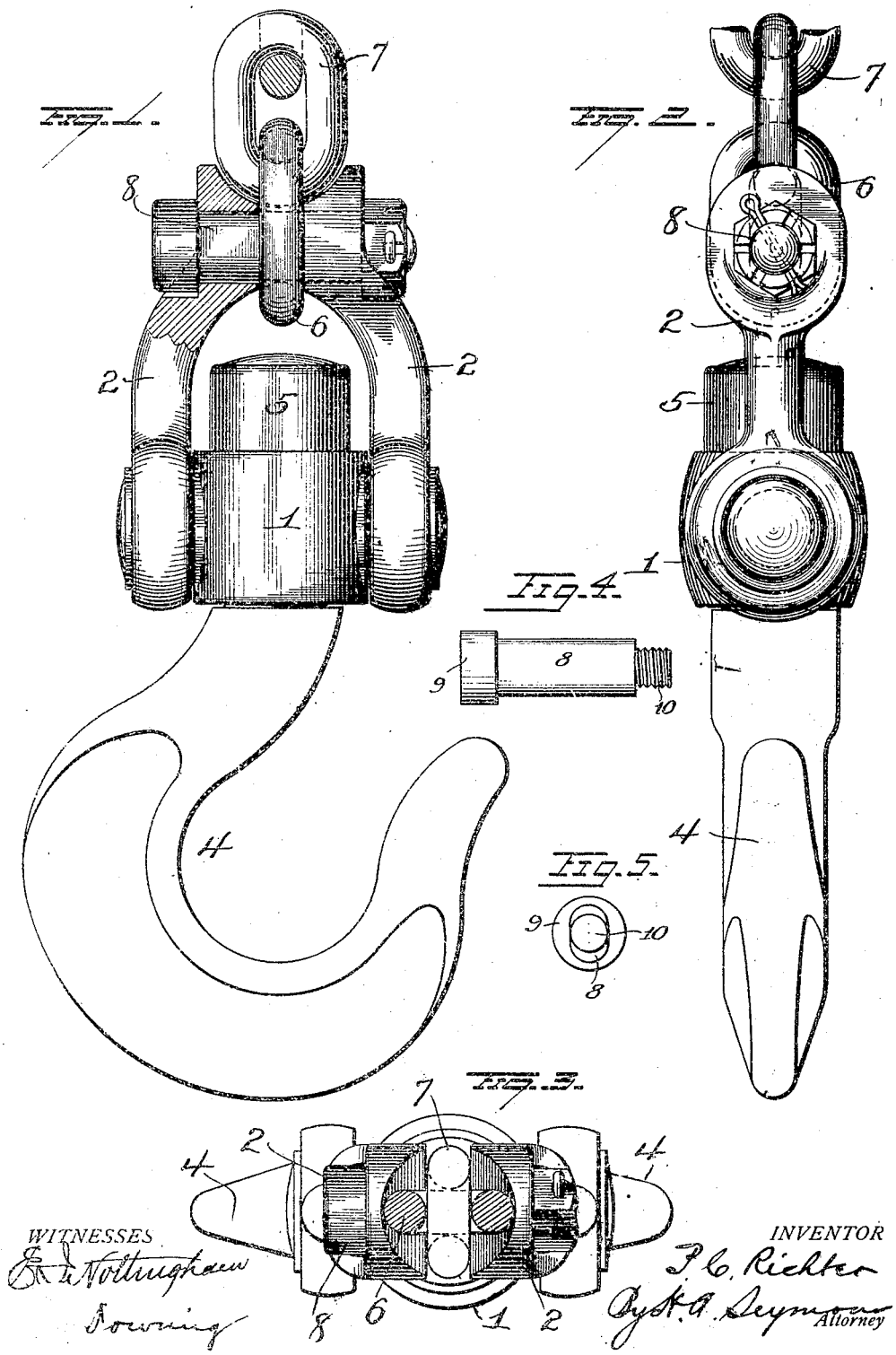

PAUL C. RICHTER, OF STAMFORD, CONNECTICUT, ASSIGNOR TO THE YALE & TOWNE MANUFACTURING COMPANY, OF STAMFORD, CONNECTICUT.

COUPLING FOR CHAINS.

1,119,636.

Specification of Letters Patent.

Patented Dec. 1, 1914.

Application filed March 5, 1914. Serial No. 322,704.

*To all whom it may concern:*

Be it known that I, PAUL C. RICHTER, of Stamford, in the county of Fairfield and State of Connecticut, have invented certain new and useful Improvements in Couplings for Chains; and I do hereby declare the following to be a full, clear, and exact description of the invention, such as will enable others skilled in the art to which it appertains to make and use the same.

My invention relates to an improvement in clevises, the object being to provide a clevis which may be economically manufactured, and which will be particularly adapted for connecting a hook, or other similar device, to the free end of a chain, the design of the clevis and its method of manufacture being such that it shall be at least as strong as the links of the chain.

In the accompanying drawings, Figure 1 is a view in side elevation, partly in section of my improvement; Fig. 2 is a view in elevation, Fig. 3 is a view in plan, showing the chain in section, and Fig. 4 is a side view and Fig. 5 an end view of the bolt or key.

The usual method heretofore employed to make a connection between a hook or other similar device, with the free end of a chain, has been to provide a cut link which is then threaded through the end of the chain and the one piece clevis on the end of the hook, and the cut ends of the link welded together. Obviously, if this welding is done by a careless or unskilled workman, it will mean that the chain is weak at this point.

My device provides a clevis which can be readily manufactured so that the strength of the parts is known, and is fully equal to the rest of the chain, and so made that it can be readily used to connect a hook to the free end of the chain by any unskilled person, the connection being such that it cannot be made except in the proper manner.

The yoke or clevis is made of two independent members 2, curved as shown and enlarged at their lower ends to receive the ends of the crosshead 1, carrying the hook 4, which is free to turn in said crosshead, and which may be secured to the crosshead by the nut 5, or in any other convenient method. This crosshead is mounted to turn in the side members 2 of the yoke or clevis, and may be secured therein by upsetting its ends as shown, or by any other suitable means.

The upper ends of the side members 2 of the yoke or clevis, when brought opposite each other, are separated sufficiently to permit of the entrance between them of a link 6 of the free end of the chain 7. These upper ends of the side members 2 are elongated, and with their inner sides curved to conform substantially to the shape of the end of a chain link. They are also provided with holes to receive a bolt or key, as hereinafter referred to, the object of the elongation, and the curving of these ends, being to provide the necessary sectional area to give strength for end strains, and the curve being necessary to give the proper play for a chain link.

The link on the free end of the chain is passed between the upper ends of the side members 2, and the key 8 is passed through said side members and through the link, and is secured in place by a head on one end and a lock nut on the other, or in any other desired manner.

It is desirable that the bolt or key 8 shown detached in Figs. 4 and 5 should be oblong in cross section, with its greatest diameter in the direction of the line of stress, so that it may have greater strength to resist the shearing strains on both sides of the link which will be imposed on the key when a load is suspended on the hook, and it may have a head 9 at one end and be reduced and threaded at its other end 10 for the attachment of a nut.

It is obvious that the shape of the various elements going to make up this clevis is immaterial, as they may be adapted to various devices, either at the low or upper end of the clevis.

Having fully described my invention what I claim as new and desire to secure by Letters-Patent, is:—

1. A clevis composed of two members, said members adapted to support a hook or yoke at their lower ends, and being provided with elongated upper ends shaped so as to adapt them to a chain link or other similar device, and provided with holes through said elongated upper ends adapted for the entrance of a bolt or key.

2. A clevis composed of two members, said members adapted to support a hook at their lower ends, and provided with elongated upper ends shaped so as to adapt them to the supporting end of a suspension device, and also provided with elongated holes, and a key elongated in cross section and passing through said elongated holes and through the said suspension device.

In testimony whereof, I have signed this specification in the presence of two subscribing witnesses.

PAUL C. RICHTER.

Witnesses:
  SCHUYLER MERRITT,
  WILLIAM P. MOSELEY.